(12) United States Patent
Goforth

(10) Patent No.: US 9,051,084 B2
(45) Date of Patent: Jun. 9, 2015

(54) INTERNAL LIQUID DRAINAGE AND REMOVAL CONTAINER LINER

(71) Applicant: Marty Goforth, Cushing, OK (US)

(72) Inventor: Marty Goforth, Cushing, OK (US)

( * ) Notice: Subject to any disclaimer, the term of this patent is extended or adjusted under 35 U.S.C. 154(b) by 0 days.

(21) Appl. No.: 13/903,581

(22) Filed: May 28, 2013

(65) Prior Publication Data

US 2013/0334238 A1  Dec. 19, 2013

Related U.S. Application Data

(60) Provisional application No. 61/659,568, filed on Jun. 14, 2012.

(51) Int. Cl.
*B65D 25/16* (2006.01)
*A47J 41/00* (2006.01)
*B65D 25/28* (2006.01)

(52) U.S. Cl.
CPC ............ *B65D 25/16* (2013.01); *B65D 25/2844* (2013.01); *B65D 25/2835* (2013.01); *B65D 25/2852* (2013.01); *A47J 41/0088* (2013.01)

(58) Field of Classification Search
CPC .............. B65D 25/16; B65D 25/2852; B65D 25/2864; B65D 25/2861; B65D 25/2844; B65D 25/2838; B65D 25/2835; B65D 1/38

USPC ......... 220/501, 772, 761, 762, 763, 764, 766, 220/770, 23.87, 915.2
See application file for complete search history.

(56) References Cited

U.S. PATENT DOCUMENTS

| | | | | |
|---|---|---|---|---|
| 4,403,483 A * | 9/1983 | Lisalda | ................. | 62/457.1 |
| 4,424,687 A * | 1/1984 | Morgan | ................. | 62/457.1 |
| 4,515,421 A * | 5/1985 | Steffes | ................. | 312/351 |
| 5,469,986 A * | 11/1995 | Jang | ................. | 220/762 |
| 5,522,239 A * | 6/1996 | Schwartz et al. | ................. | 62/457.5 |
| D377,028 S * | 12/1996 | Monday | ................. | D15/90 |
| 5,605,056 A * | 2/1997 | Brown et al. | ................. | 62/457.4 |
| 6,321,929 B1 * | 11/2001 | Weshler et al. | ................. | 220/555 |
| 7,313,928 B2 * | 1/2008 | Girard | ................. | 62/459 |

* cited by examiner

*Primary Examiner* — Stephen Castellano
(74) *Attorney, Agent, or Firm* — Daniel Boudwin; Global Intellectual Property Agency LLC

(57) ABSTRACT

An internal liner for a cooler is provided having a base attached to a set of side walls with handles along the uppermost edge thereof. The base includes a plurality of apertures disposed along its surface to allow liquid to pass therethrough. The liner is placed into a cooler or similar container prior to normal use. When ice is used in conjunction with a cooler, it melts and forms standing water. The liner holds stored items within the cooler and can be lifted from the cooler to separate the contents from the water, thus allowing a user to pour out excessive water from the cooler without displacing its contents. The liner provides a method to efficiently separate standing water from stored items within a cooler when utilized in conjunction with water, where the user desires to remove water from within the cooler.

9 Claims, 4 Drawing Sheets

INTERNAL LIQUID DRAINAGE AND REMOVAL CONTAINER LINER

CROSS REFERENCE TO RELATED APPLICATION

This application claims the benefit of U.S. Provisional Application No. 61/659,568 filed on Jun. 14, 2012, entitled "Ice Basket." The above identified patent application is herein incorporated by reference in its entirety to provide continuity of disclosure.

BACKGROUND OF THE INVENTION

1. Field of the Invention

The present invention relates to temperature insulated storage containers. More specifically, the present invention pertains to a new and unique liquid separation device, wherein a rigid, internal liner having a perforated structure is inserted into a container prior to use with ice and other foodage items. Once the ice begins to melt within the container, a user may lift the liner to separate the resultant liquid from the foodage items for subsequent removal of the liquid from the container.

Many individuals enjoy taking day trips, going to a concert, or going on vacation. During these trips, individuals often pack meals and beverages in advance and store the items in temperature insulated containers such as an ice chest or cooler. To keep the temperature lowered throughout the day, an individual often resorts to using self-contained ice-packs or ice cubes poured over the items. If an individual uses ice, as time goes on the ice will eventually melt and form an area of standing water at the base of the container. This causes an issue for stored food as the liquid may penetrate the individual food or beverage containers or wrappers food stored within the cooler.

When taking a day trip or while traveling, it is extremely important for an individual to prevent food contamination. It is also important to properly control the temperature of the items in a cooler, otherwise the ice will melt completely and items may spoil prior to consumption. The use of ice in a cooler requires planning, which involves using a limited amount of ice and proper storage techniques of perishable items to ensure the quality thereof during the storage period.

Individuals therefore require an efficient means of properly separating liquid water and ice from a cooler throughout a day trip or event. Placing a large amount of ice into a cooler will quickly lower the temperature of the contents, but also result in a large amount of water forming once the ice melts. Another contributing issue to rapid ice melting is if an individual places smaller sized ice cubes into the cooler, as opposed to larger chunks, which will result in more rapid melting thereof. These situations lead to unfortunate events wherein a cooler will quickly fill with water, yet the individual does not have an adequate means or system to remove the water from the cooler without resorting to removal of all food and beverage contents therefrom.

The present invention provides a new and unique cooler separation device that provides a removable, perforated liner within a cooler to facilitate separation of ice and food contents from free standing water within the cooler interior. The liner comprises a rigid, substantially rectangular structure that includes perforations along its base surface to allow liquids to freely pass therethrough. When the device is lifted from the interior of the cooler, the liner supports the un-melted ice and the contents of the cooler, while water flows through the base surface and into the cooler. The cooler of free standing water can then be drained, whereafter the liner and cooler contents can be reinserted therein. Overall, the device improves one's ability to remove objects from a cooler while also separating those objects from melted ice, while also providing an efficient manner to remove all contents from a cooler after use.

2. Description of the Prior Art

Devices have been disclosed in the prior art that relate to cooler inserts. These include devices that have been patented and published in patent application publications, and generally relate to inserts for the purpose of separating certain items and liquid in a cooler. The following is a list of devices deemed most relevant to the present disclosure, which are herein described for the purposes of highlighting and differentiating the unique aspects of the present invention, and further highlighting the drawbacks existing in the prior art.

Specifically, U.S. Pat. No. 4,424,687 to Morgan discloses an ice rack for use in a portable ice chest that includes a planar surface such as a platform placed at the base of the ice chest interior. The platform includes a plurality of openings along its surface to enable multiple units of the device to be inserted to form a stacked unit. The device also includes a plurality of apertures allowing air transfer so the ice can chill the items placed within the ice chest. While disclosing a novel stackable unit for use with an ice chest, the Morgan device fails to disclose the novel way of the present invention to remove the insert and also separate liquid from items placed within the cooler.

U.S. Pat. No. 5,522,239 to Schwartz is another device that discloses a cooling insert for beverages used to help control the internal temperature of cooler. The device comprises a cylindrical elongated member with multiple concave openings along its ends to hold a standard beverage can in place while in a cooler. The device further includes an internal open volume, secured by a screw cap, to pour water therein, so it may be frozen prior to use. This device, though offering a novel means to cool the internal volume of a cooler, does not disclose a novel means of removal of the device or a means to separate liquid from stored items. The Schwartz device also is intended solely for use with cylindrical beverage containers, which limits its utility.

Another disclosed device is U.S. Pat. No. 5,605,056 to Brown, which is a portable cooler with suspended grates in its internal storage area. The device comprises a cooler with multiple inserts along its side walls. Each insert is a grated surface to place various items such as bait for fishing. The base of the device includes a separate container to store ice to cool the contents of the device. The Brown device discloses a novel use of a multi-tiered cooling system within a cooler, however, it is not a removable insert like the present invention. Though the function of the device is similar in separating melted ice or water from stored items, the present invention also includes the novel feature of being removable from a cooler, whereas with the Brown device this is not possible.

Finally, U.S. Pat. No. 7,313,928 to Girard discloses another insert for a cooler. Similar the Morgan device, the Girard device comprises a raised planar surface with apertures along its surface placed at the base of internal volume of a cooler. Additionally, the device includes a series of guidelines along the uppermost surface of the device to enable a user to cut portions of the device to fit in various sized coolers. Just as with the Morgan device, the Girard device fails to disclose a novel means to remove the device from a cooler as illustrated by the present invention, which includes the novel arrangement of rigid side walls with grips attached to the uppermost surface to easily remove the device from a cooler.

It is submitted that the present invention is substantially divergent in design elements from the prior art, and consequently it is clear that there is a need in the art for an improvement to existing water and content separation devices for use in coolers. In this regard the instant invention substantially fulfills these needs.

SUMMARY OF THE INVENTION

In view of the foregoing disadvantages inherent in the known types of cooler inserts now present in the prior art, the present invention provides a new removable insert having apertures along its base surface and handles along the perimeter of its uppermost edge, wherein the device can be utilized to effectively separate stored items from standing water that has formed within a cooler device or similar storage container.

It is therefore an object of the present invention to provide a new and improved cooler insert that has all of the advantages of the prior art and none of the disadvantages.

It is another object of the present invention to provide an insert that is form-fitting to the interior of the given cooler, wherein the present invention does not obstruct any normal features thereof such as opening and closing its lid and its substantial carrying capacity.

Another object of the present invention is to provide cooler insert having an improved means of removal from a cooler, wherein the device includes a set of handles positioned along the uppermost perimeter of its structure.

Yet another object of the present invention is to provide a cooler insert that readily separates liquid from solid ice and stored items therein, wherein the device includes apertures along the base of the device to enable liquid to freely flow from the device interior when lifted from inside a cooler.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
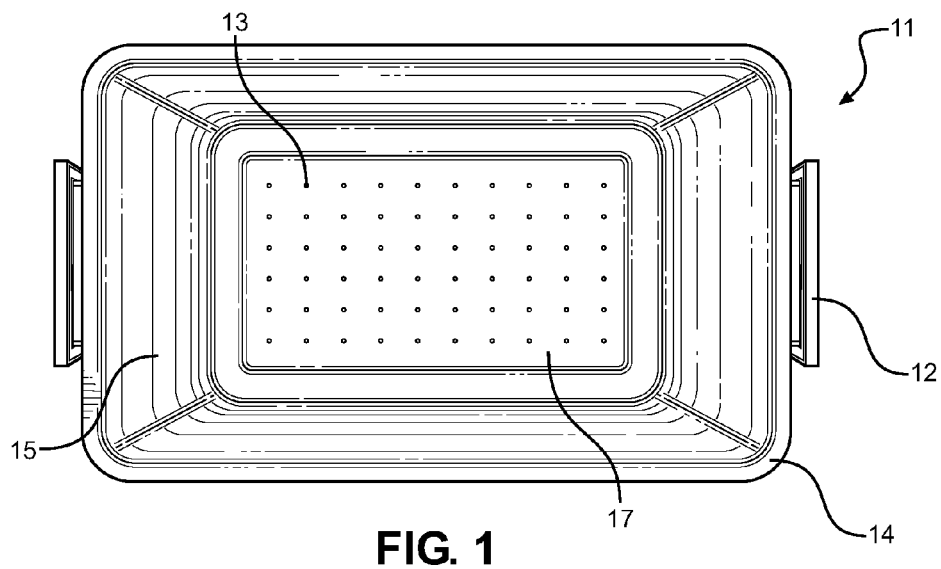
FIG. 1 shows an overhead perspective view of the cooler insert prior to placement within a cooler, highlighting the apertures along the base as well as the handles to transport the present invention.

Reference is made herein to the attached drawings. Like reference numerals are used throughout the drawings to depict like or similar elements of the cooler insert. For the purposes of presenting a brief and clear description of the present invention, the preferred embodiment will be discussed as used for placement within a cooler. The figures are intended for representative purposes only and should not be considered to be limiting in any respect.

Referring now to FIG. 1, there is shown an overhead view of the cooler insert 11 of the present invention prior to placement within a cooler, highlighting the apertures 13 along the base surface 17 of the device, as well as the handles 12 to transport the device and to lift the device from the interior of a cooler. The device comprises an insert structure 11, wherein the device includes a base surface 17, upstanding sidewalls 15, and a pair of lifting handles 12. The base 17 of the device includes a plurality of spaced apertures 13 therealong. Each sidewall 15 comprises a substantially rectangular shape and attaches to the largely rectangular base surface 17 of the device to establish an open cuboid shape having an interior open interior volume with an open upper. The uppermost portion 14 of the sidewalls 15 may form a lip or a simply squared edge termination that forms the upper perimeter of the device.

The construction of the device 11 allows for it to be deployed as a liner along the interior of a cooler or similarly constructed storage container. The base 17 and side walls 15 are adapted to mimic the shape and conform to the interior walls and base of a given cooler to optimize the amount of interior volume available while the liner device is installed therein. The handles 12 are positioned along opposing sidewalls 15 either along the outer surfaces thereof, along the inner surfaces thereof, or positioned in alignment with the sidewalls so as to reduce the liner cross section when installed within the cooler interior. The handles 12 are hinged from the sidewalls so as to support normal carrying and lifting angles thereof with respect to a user's hands. Meanwhile, the apertures 13 disposed along the base surface 17 of device are preferably evenly spaced and of sufficient diameter to allow for a uniform and rapid drainage of liquid therethrough when in use, while also preventing larger items from falling therethrough.

Figure 2:
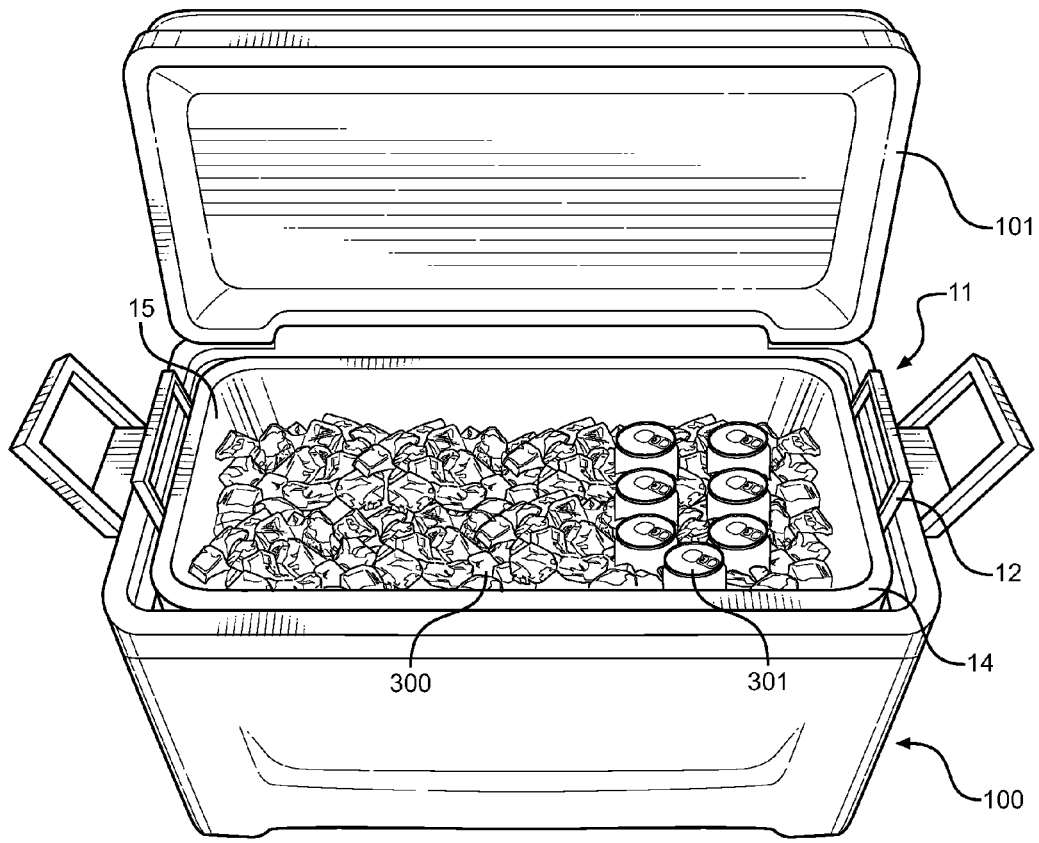
FIG. 2 shows a perspective view of the cooler insert in use while placed inside a conventional cooler.

Referring now to FIG. 2, there is shown a perspective view of the cooler insert 11 in use while placed inside a conventional cooler 100. The liner 11 is inserted into a conventional cooler 100 interior before the ice 300 and foodage items 301 are placed therein. These foodage items 301 may include beverages, snacks, and other items that require cooled storage prior to consumption. In order to keep all these items 301 at a suitable temperature and to prevent food spoilage and provide a refreshing beverage, ice 300 is utilized to rapidly cool the contents 301 while the cooler acts as an insulating container to slow the ice melting. Inevitable melting of the ice 300, however, leads to liquid water along the base of the cooler 100. Therefore, placement of the liner 11 within the cooler 100 interior before the ice 300 or foodage contents 301 allows the liner to act as a support for solid items while allowing liquid water to drain through its apertured base surface. Once ice 300 and contents 301 is placed within the liner, the user may close the lid 101 of the cooler 100 as normally provided to further lower the temperature or preserve the current temperature depending on the amount of ice 300 used. It is contemplated that the liner 11 is designed to fit within the interior volume of the cooler 100 and allow the lid 101 thereof to secure closed in its naturally seated position against the cooler upper edge. Therefore, the normal operation of the cooler 100 is preserved while the interior volume consumed by the liner 11 is minimized.

When the liner 11 is inserted into a cooler 100, the side walls 15 and base 17 conform to the interior thereof. The side walls 15 and base 17 of the liner 11 are placed in contact with their corresponding areas of the cooler 100 interior, while the upper edge 14 of the liner 11 terminates before the upper edge of the cooler 100. This prevents any loss of volume that may exist between the liner 11 and a cooler 100, while also allowing free movement and securement of the lid 101. In use, the handles 12, whether angled or outwardly/inwardly hinged, are disposed along opposing sidewalls 14 to allow for efficient and stable lifting thereof. Since the liner 11 conforms to the shape of the interior of the cooler 100, the handles 12 will adjust and position themselves at a near vertical angle. This result is beneficial for two reasons. First, it allows a user to easily grip the handles 12 when he or she removes the present invention from a cooler. Second, the handles 12 will be a in a position to not obstruct the lid 101 of the cooler from closing properly. This simplifies the way in which a user will remove the present invention from a cooler 100 and reduces wasted space or interferences with the cooler lid 101

Figure 3:
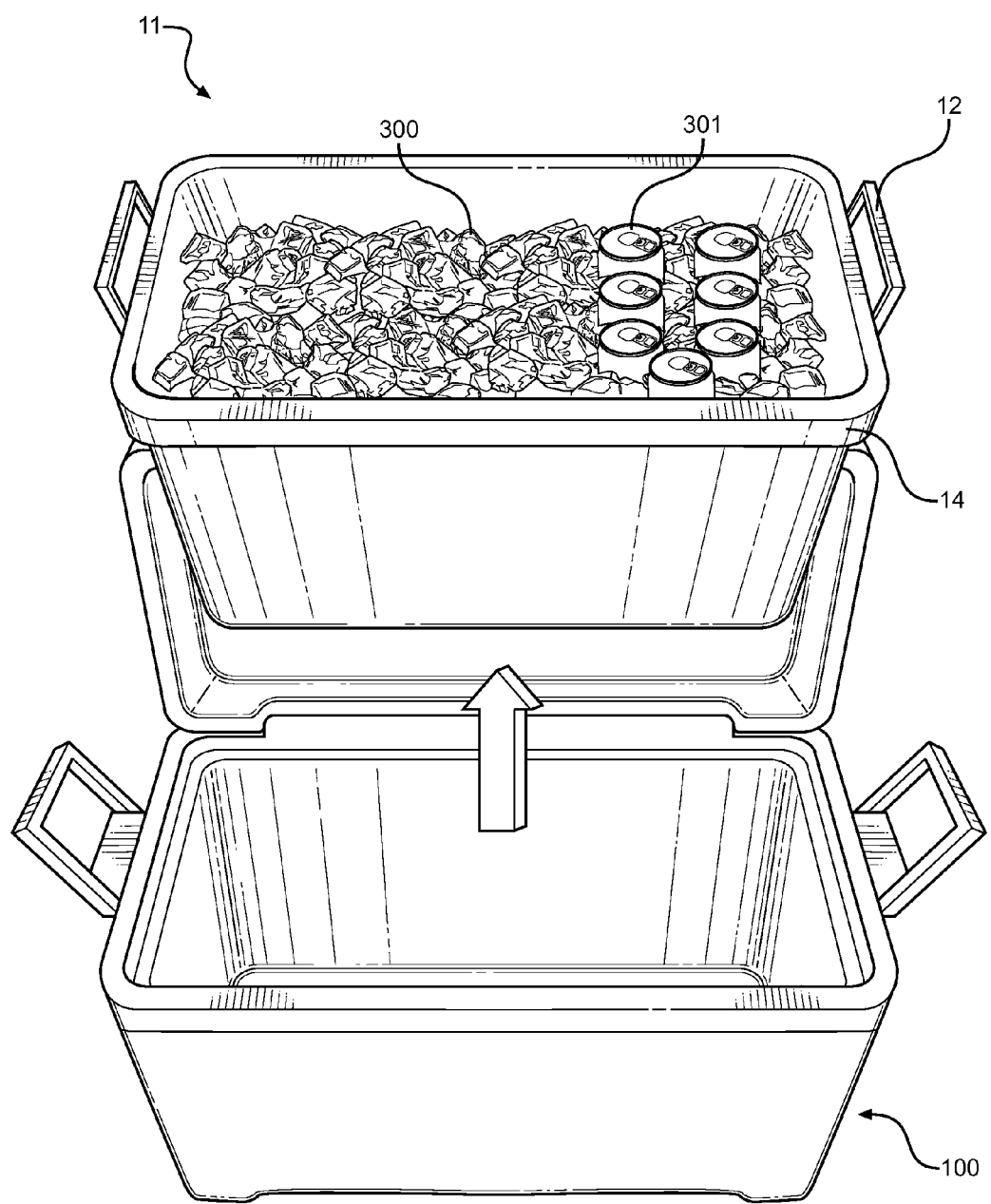
FIG. 3 shows a perspective view of the cooler insert as it is being removed from a conventional cooler.
Figure 4:
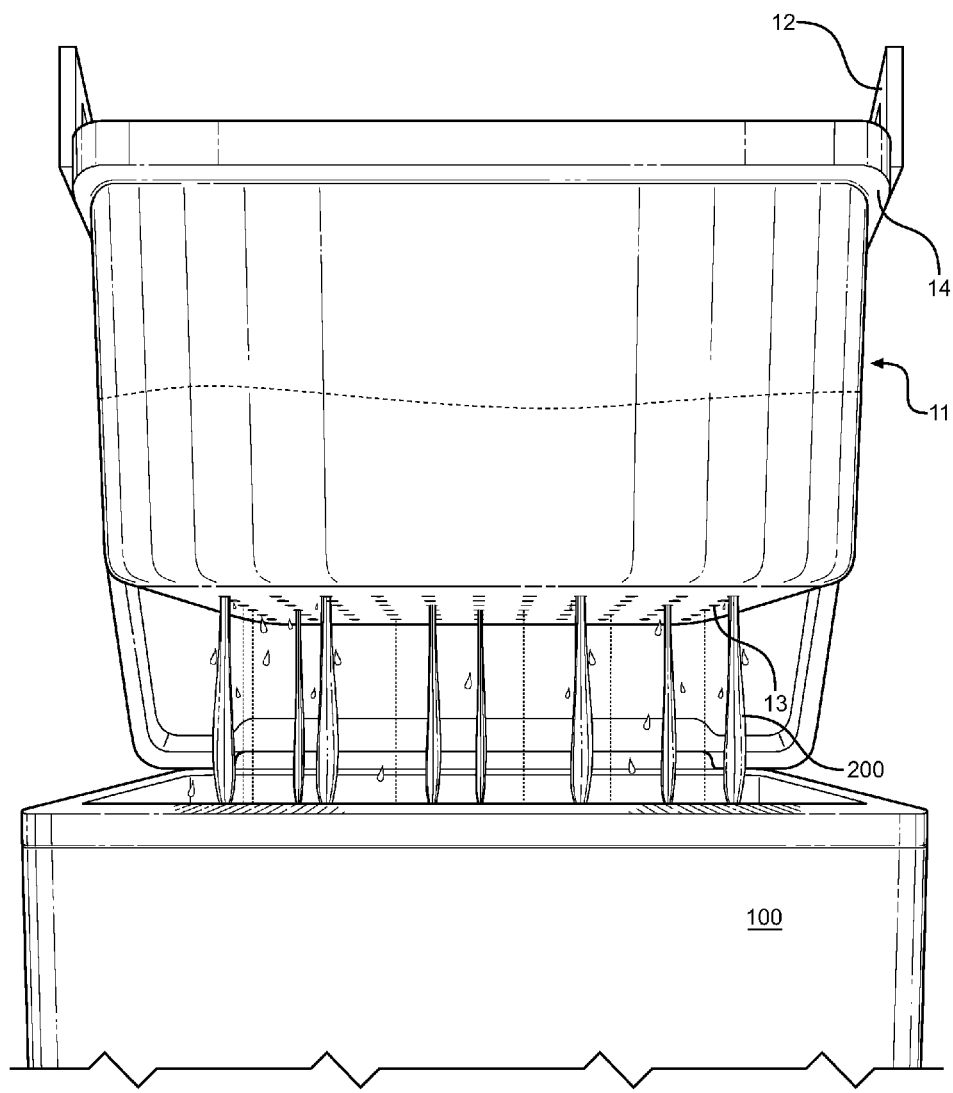
FIG. 4 shows a side view of the cooler insert as it is being removed from a conventional cooler and liquid is freely flowing through the apertures of the base of the present invention.

As shown in FIG. 3, the liner 11 of the present invention is being removed from a cooler 100 and supporting food items 300 and ice 301 within its open interior. The apertures 13 along the base 17 provide liquid-permeable openings to allow water and spilled fluid to pass therethrough while supporting non-liquid items therein. This construction is beneficial if a user packs the present invention with ice prior to insertion into a cooler 100 or if a user needs to remove the contents and un-melted ice from a cooler 100, as nothing contained within the liner interior can fall through the apertures 13. Thus the device allows a user to remove the contents of the cooler while separating any fluid therefrom, thereby allowing the cooler to be efficiently drained and cleaned. Referring now to FIG. 4, there is shown a view of the cooler insert 11 as it is being removed from the cooler 100. As the liner 11 is lifted, liquid 200 freely flows through the apertures 13 of the base surface 17 and back into the cooler 100 or into an open space away from the cooler 100.

The present invention is intended to drain and separate liquid (notably melted ice) from items stored therewithin. In a normal situation, a user packs the cooler with a variety of items that will be consumed throughout the day. To keep the items at an optimal temperature, ice or other frozen or cold objects are used to sustain an optimal temperature thereof. Ice melts over the course of time and results in a puddle of water formed along the base of the cooler. It is important to periodically remove water from a cooler because it can penetrate packaging of stored items and destroy its contents. Also, a large amount of water in a cooler is very heavy to transport and can be a problem for many individuals if they are transporting a cooler alone.

Figure 5A:
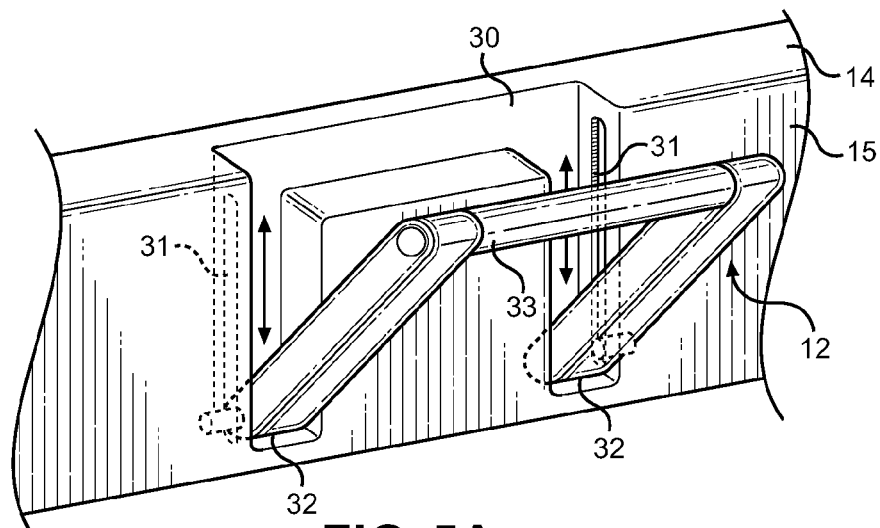
FIG. 5a shows a view of an embodiment of the device handle, wherein the handle is slidably and pivotably attached to an inset channel in the device sidewall to reduce the consumed space within a cooler interior.
Figure 5B:
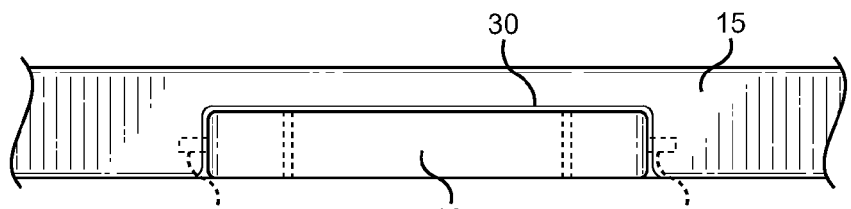
FIG. 5b shows an overhead view of the same inset handle embodiment of the device, highlighting the condensed nature thereof against the device sidewall.

Several embodiments are contemplated for the present invention, including embodiments of the cooler structure and of the handle layout. The latter of these is displayed in FIGS. 5a, 5b, 6a, and 6b. Referring to FIGS. 5a and 5b, the handle 12 is situated along the liner sidewall 15 such that its structure can be completely contained within the width of the sidewall when stowed and angularly positioned therefrom during lifting or carrying of the liner. As shown, the handle 12 is pivotably attached to slots 31 disposed along the interior of a channel 30 adapted to match the shape of the handle 12 and thus allow the handle to imbed therein when stowed. The handle 12 is ideally an inverted U-shape having pivotably and slidably-attached ends 32 that are engaged into the channel slots 31 by way of outward tabs. The slot-tab engagement allows free rotation of the handle 12 for improved purchase thereof, while the handle ends 32 are also free to slide vertically along the channel 30 for positioning the cross member 33 of the handle above the upper edge 14 of the liner when handling the same. FIG. 5b highlights the stowed position of the handle 12 within the channel 30, which is disposed within the thickness of the sidewall to remove any outward projections therefrom and thus reduce the overall cross section of the liner when positioned within the cooler interior.

Figure 6A:
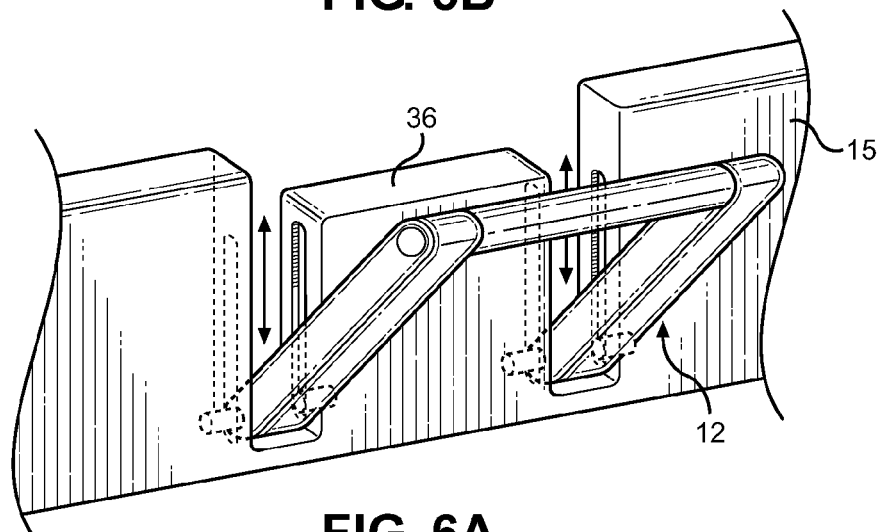
FIG. 6a shows a view of yet another embodiment of the device handle, wherein the handle is slidably and pivotably attached to an inset channel in the device sidewall and can freely rotate from the sidewall in either direction.
Figure 6B:
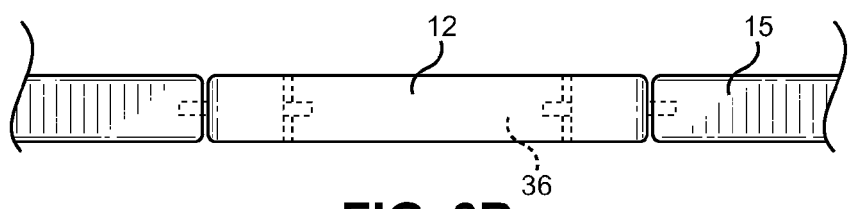
FIG. 6b shows an overhead view of the freely pivotable inset handle embodiment of the device.

Referring now to FIGS. 6a and 6b, yet another handle embodiment is visualized. This embodiment includes a channel 30 having an open upper and no back wall against which the handle 12 can rest against. Rather an upstanding portion 36 of the sidewall 15 closes the handle interior, which the pivotable and slidable handle 12 is free to pivot inward or outward from the liner sidewall 15. This improves the range of motion of the handle 12 and thus the ease with which a user can grasp the handles 12 when removing the liner from within the cooler interior. Pivoting inward allows for better purchase while the liner is installed within the cooler, while outward pivoting allows for better handling outside of the cooler by the user.

The final embodiment of the handles is shown in FIGS. 1 through 4, wherein the handles 12 are pivotably disposed along the sidewall 12 surfaces. It is contemplated that this provides the simplest configuration, while the handles 12 can be positioned along the interior surface or exterior surface of the sidewalls as desired. This embodiment, however, does not embed the handle 12 within the sidewall thickness, but hingedly positions it along the interior or exterior sidewalls surfaces of the liner.

A final embodiment of the present invention relates to the liner structure. It is contemplated that the device may be comprised of a relatively rigid construction to allow for greater carrying capacity and a stable structure. Yet it is also contemplated that the structure may be comprised of more malleable, thinner materials that allow the liner to conform to the cooler interior geometry. The sidewalls, or the sidewalls in conjunction with the base surface, may be constructed of a thin, rubber or plastic material that can conform to the interior spaces of the cooler. In this alternative embodiment, the liner is not stressed when placed into a cooler of mismatched design, where otherwise the rigid embodiment may distort and even crack if forced into an improperly sized cooler interior.

The present invention can be utilized to effectively separate water from stored items within a cooler. At any time a user may lift the liner from the cooler interior. While the device is lifted, gravity will force any liquid to pass through the apertures along the base surface of the device, and the liquid will fall into the cooler interior while the solid articles within the liner are retained therein. A user may place the present invention onto the ground where additional water may continue to escape and then drain any liquid deposited within the cooler while the liner is removed.

It is difficult to for an individual to constantly replace ice in a cooler, and it is further frustrating when ice has already melted and formed a puddle of water within a cooler. Once an individual needs to pour out the water from the cooler, he or she generally needs to individually remove the majority of the items within before dumping the water therefrom. This is both tedious and a time consuming exercise. Therefore, the present invention describes an inner liner for a cooler. The device comprises a liner for the interior volume of a cooler that includes a series of apertures along its base as well as a set of handles. The apertures allow water to freely flow from the device when it is raised by the handles out of a cooler. This provides a user with a simple and efficient method of separating items within a cooler from water formed by melted ice.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A container liner for draining liquid therefrom and supporting solid items therein, comprising:
    a liner structure having upstanding sidewalls, a base surface, an upper perimeter edge, and an open interior volume forming an open, largely cuboid shape with an open upper;
    a pair of handles being oppositely disposed to each other and each being hingedly secured to one of said upstanding sidewalls;
    said base surface having a plurality of apertures disposed therealong and adapted for water drainage therethrough
    wherein the handles comprise inverted U-shapes;
    wherein the handles are embedded within their respective sidewalls when the handles are in an upstanding position and aligned with their respective sidewalls.

2. The device of claim 1, wherein said liner structure further comprises a semi-rigid material, whereby liner is adapted to be conformed to the internal volume of a larger container.

3. The device of claim 1, wherein said upstanding sidewalls of said liner structure further comprise thin, malleable material that is adapted to actively conform to the internal volume of a larger container.

4. The device of claim 1, wherein said base surface and upstanding sidewalls of said liner structure further comprise thin, malleable material that is adapted to actively conform to the internal volume of a larger container.

5. The device of claim 1, wherein said handles are hingedly attached to an exterior surface of said upstanding sidewalls.

6. The device of claim 1, wherein said pair of handles are hingedly attached to an interior surface of said upstanding sidewalls.

7. The device of claim 1, wherein said handles is are hingedly and slidably attached within a channels along their respective sidewalls.

8. The device of claim 7, wherein said handles have a cross member and distal ends that engage a slot within said channel, said channel being U-shaped and being partially disposed within said sidewall thickness to allow said handle to pivot therefrom in one direction.

9. The device of claim 7, wherein said handles are inverted U-shapes having a cross member and distal ends that engage a slot within said channel, said channel being U-shaped and disposed completely through said sidewall thickness to allow said handle to pivot therefrom in an inward or outward direction.

* * * * *